INVENTORS.
JULIUS L. GIOVANNUCCI
& ALAN R. PELS
& PAUL A. KING

ATTORNEYS

Aug. 5, 1958  J. L. GIOVANNUCCI ET AL  2,845,698
METHOD OF MAKING COMPOSITE METAL AND PRODUCT THEREOF
Filed June 10, 1954  2 Sheets-Sheet 2

INVENTOR.
JULIUS L. GIOVANNUCCI
& ALAN R. PELS
BY & PAUL A. KING

Kenyon & Kenyon
ATTORNEYS

2,845,698

METHOD OF MAKING COMPOSITE METAL AND PRODUCT THEREOF

Julius L. Giovannucci, Stratford, Alan R. Pels, Stamford, and Paul A. King, Stratford, Conn., assignors to Bridgeport Brass Company, Bridgeport, Conn., a corporation of Connecticut Application June 10, 1954, Serial No. 435,682

12 Claims. (Cl. 29—194)

This invention relates to a composite metal product making process and apparatus invented particularly for use in manufacturing cladmetal flat sheet products but involving principles which may be applicable to other products involving a cladding of sheet metal.

One of the objects is to provide a process and apparatus for making flat sheet cladmetal products commercially in a reliable manner. Another object is to produce cladmetal having a copper or cuprous metal base clad on one or both sides with a layer of staindless metal, as exemplified by stainless steel, which is so thin that if the base metal exhibits orange peeling when drawn this defect will be visible on the stainless metal surface, in such a manner that the cladmetal base has a sufficiently fine grain size to avoid this kind of trouble and with the stainless layer or layers bonded to the copper or cuprous base strongly enough ot avoid separation during drawing of the cladmetal. A further object is to attain this secondly stated kind of product reliably and in a commercially practical manner. Other objects may be inferred from the following disclosure.

A specific example of the apparatus as it is used in practicing the new process is illustrated by the accompanying drawings in which.

Figure 1:
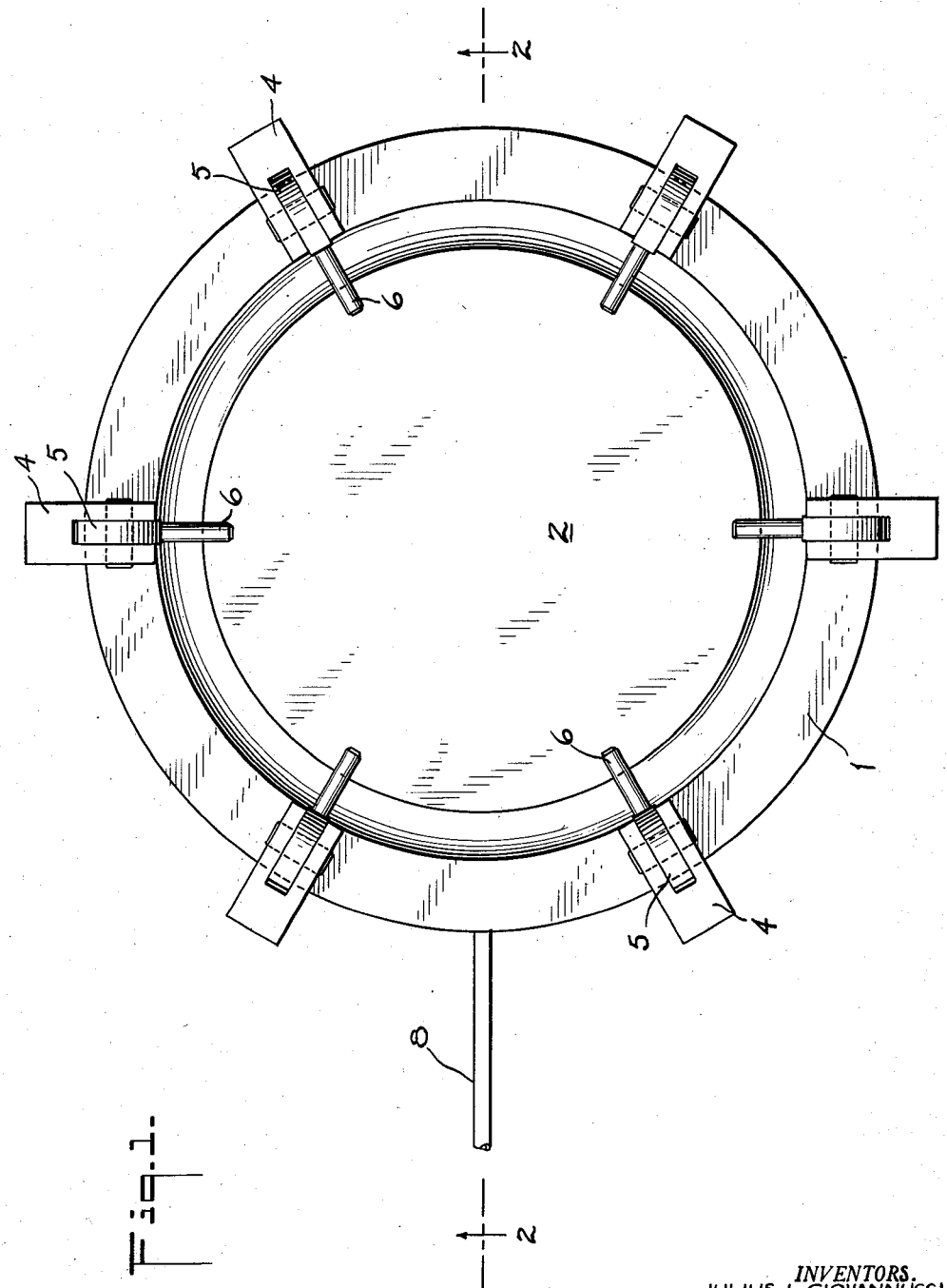
Fig. 1 is a plan view of the apparatus.

In practicing the present invention at least two flexible metal layers are superimposed with brazing material interposed between the layers' mutually facing surfaces. Two layers are involved when producing duplex cladmetal while three layers are involved when making triplex cladmetal. In all cases the outermost layer or layers are within the thickness ranges of sheet metal gauges. They must be thin enough to flex appreciably when subjected on one side only to fluid pressure no higher than atmospheric pressure with the flexure occurring with relative freedom between relatively short span lengths. The base metal is ordinarily substantially thicker than the cladding metal. In most instances the total thickness of all of the layers when superimposed, to make one cladmetal component, is thin enough to have the flexibility just described.

The base metal particularly contemplated is copper or cuprous. It may be any high-copper or copper base alloy which is suitable for drawing and forming when properly processed. The base metal must be capable of being brazed. The stainless metal, with which the base metal is clad on one or both sides, may be Inconel, Monel or zirconium, but the metal particularly contemplated is stainless steel. The stainless material should be suitably processed to provide it with adequate drawing properties because the cladding procedure of the present invention ordinarily does not provide for enough heating to affect the properties of the stainless materials. For example, if stainless steel is used it should be annealed so that it will draw properly.

It is to be understood that the present invention does not necessitate any further thickness reduction of the metal layers and that, therefore, the cladmetal components may be sheet metal which has previously been worked fully to the gauge desired.

Preferably a plurality of such cladmetal assemblies are piled flatly on top of one another. Each assembly comprises the base metal layer and one or two cladding layers with the brazing material interposed appropriately. When piled or stacked the total thickness of the stack should not provide such stiffness that the interfaces of the individual sheets fail to conform throughout their areas when subjected to flexing pressures no higher than atmospheric pressure. In practicing the invention when using .024" thick copper sheets and .015" stainless steel sheets, it has been found to be practical to stack as many as 20 duplex assemblies or 16 triplex assemblies. However, the permissible thickness of the stack depends on the flatness of the sheet components, sheets of good flatness permitting thicker stacks than do sheets that tend to curve somewhat. Sheets having lengthwise or transverse gauge variations which are substantial may also limit the permissible stack thickness.

Such a stack is placed inside of the fixture shown by the drawings. There is no brazing material between the interfacing surfaces of adjacent cladmetal assemblies.

This fixture comprises two rigid metal rings 1 which are of the same diameters and between which two flexible sheet metal diaphragms 2 are clamped, the diaphragms being spaced apart by a ring 3. The mutually abutting surfaces of the rings 1, the diaphragms 2 and of the ring 3 are smoothly finished so that with adequate clamping pressure on the rings 1 the fixture is made air-tight or nearly so.

The clamping pressure is applied to the rings 1 by a series of peripherally interspaced clamps 4 which may be in the nature of C clamps producing pressure by means of cams 5 which may be turned by radially projecting studs 6. A pipe or the like may be slipped over these studs to swing them so as to get good clamping pressure and when required to release the clamps.

The ring 3 has a radially extending hole 7 formed through it so as to open between the diaphragms 2, and a metal tube 8 is secured in this hole 7 to the ring 3. This tube extends to a source of vacuum which is sufficient to remove substantially all of the atmosphere between the two diaphragms 2, the clamps 4 maintaining the fixture air-tight.

Figure 2:
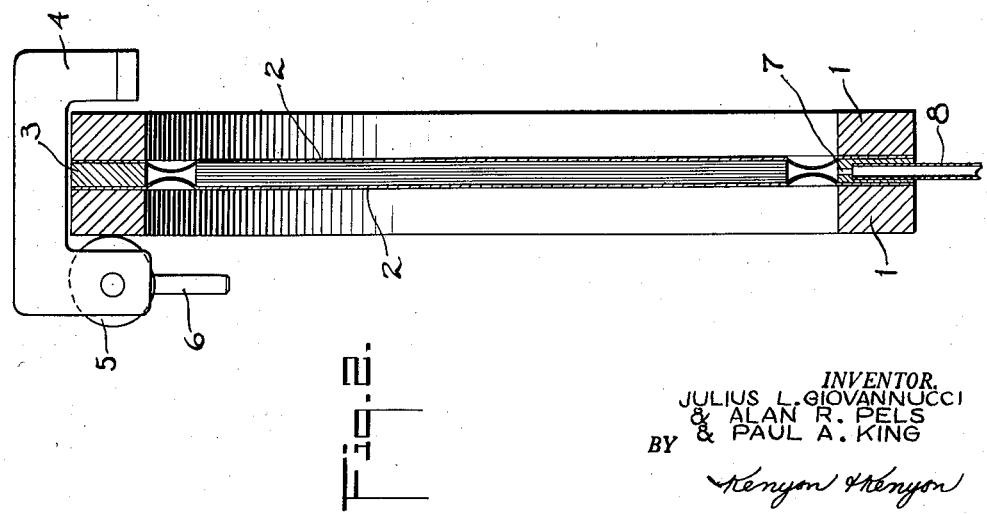
Fig. 2 is a cross section taken on the line 2—2 in Fig. 1.

Since the sheet metal diaphragms 2 may be made quite thin they are very flexible and, therefore, transmit the atmospheric pressure directly to the stack of cladmetal assemblies. The outside layers form the opposite ends of the stack and since all of the cladmetal assemblies are flexible the atmospheric pressure distributes itself throughout the stack. In this fashion the atmospheric pressure flexes each and every layer as required to cause their interfaces to conform with each other. Thus all of the interfaces are brought into contact with each other. As shown by Fig. 2, the ring 3 has a larger inside diameter than the diameter, or the lateral dimensions, of each assembly of layers placed within the fixture. Therefore, there is no edgewise restraint of any of the layers, the metal being free to expand and contract, in all directions, while continuously under the atmospheric pressure holding the assemblies in brazing relationship.

It can be seen that the stack of cladmetal assemblies forms what is in effect a sheet metal pack. The brazing material is interposed between the interfaces which are to be bonded together to form the desired cladmetal.

The use of brazing to bond the cladmetal layers together has the advantage that the temperatures required for brazing are much lower than welding temperatures. Copper and copper alloys are subject to orange peeling when drawn after the metal has been maintained at high temperatures long enough to cause the necessary increase in the grain size of the metal and which is responsible for the appearance of this kind of defect. Brazing temperatures, by selection of proper brazing materials, are low enough to avoid this trouble if the necessary heat can be imparted to the brazing material rapidly enough and removed rapidly enough. Objectionable grain growth requires both temperature and time to develop.

Figure 3:
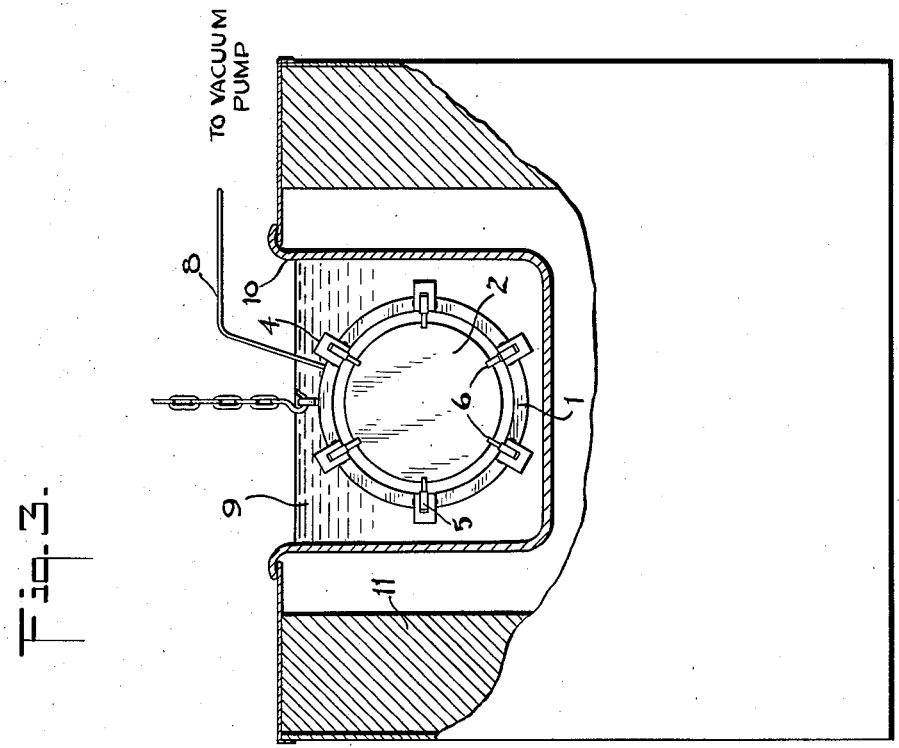
Fig. 3 is a view showing the apparatus immersed in a bath of heating liquid, the bath components being in section and the apparatus itself being in elevation.

With the stack or pack enclosed in the fixture the latter may be immersed in a hot liquid 9 as is shown in Fig. 3. A molten salt may be used, which may be contained in a suitable tank 10 suspended in a tank heating furnace 11. During this time the tube 8 is maintained in connection with the source of vacuum so that the cladmetal pack is maintained under atmospheric pressure.

It can be seen that in this fashion heat is placed in the pack very rapidly. It is practically as though the pack were suspended directly in the heating liquid bath, but all of this time various layers of the cladmetal are forced into face-to-face contact throughout their entire extents by the continuously maintained atmospheric pressure. This not only assures uniform brazing throughout but it also assures a good thermal conduction throughout the entire pack. Thus the heat gets to the brazing material rapidly so as to fuse the latter as required for brazing, and as soon as this condition is effected the fixture is removed promptly from the heating liquid so that it may be permitted to cool in the open air. Cooling is rapid because of the good conduction path previously mentioned, the vacuum being maintained during this cooling period. After the brazing material solidifies the vacuum is terminated, the clamps 4 are released, and the diaphragms 2 are separated from the pack which then consists of a stack of finished cladmetal sheets.

Due to the rapidity of the heating and cooling both the temperature and time factors may be kept at values assuring against undue grain growth on the part of the copper or copper alloy components. Therefore, the resulting cladmetal sheet may be drawn deeply, if desired, without the development of orange peeling such as would show through the stainless cladding when the latter is thin. Consequently, articles deep drawn from this material do not require extensive grinding such as is necessary to provide a good finish when the orange peeling visibly marks the outside of the stainless component.

It has been found desirable to use a brazing material which comprises a mixture of flux and brazing metal particles with the flux and particles substantially uniformly distributed between the surfaces, which are to be brazed together, in relative proportions forming a bond between these surfaces consisting of the fused slag in a highly dispersed phase mingled with a matrix of the brazing metal. This requires the use of only a very small amount of brazing metal in each instance and, therefore, makes it possible to use a brazing metal having a large silver content and consequently which fuses at a relatively low temperature. The tendency towards grain growth is, of course, reduced by the use of the lowest possible brazing temperatures.

The practice of the present invention has shown that the commercial production of the desired kind of cladmetal, having a copper or copper alloy base and a thin stainless clad layer and which is suitable for deep drawing, is aided substantially by following rather carefully certain operational details. These are explained in connection with the following description of a specific example of the present invention.

In this specific example the product made has a copper base and a stainless steel cladding on one or both sides. The copper is sheet metal which is .024" thick and the stainless is sheet metal which is .015" thick. The cladmetal is in the form of disks which are 12⅛" in diameter and are intended to be deep drawn into holloware in the form of domestic cooking utensils. It is necessary that the cladmetal layers be bonded together firmly enough not to separate during this drawing and it is very preferable that the copper component have a fine enough grain size to prevent it from developing the orange peel defect to a degree sufficient to form corresponding marks on the outside of the stainless layer. If this difficulty occurs the marks must be removed from the stainless surface by extensive and, therefore, expensive grinding.

The stainless steel may be A. I. S. I. types 301, 302, 304, 305 or 430 processed so as to develop their deep drawing properties. The copper component may be OFHC copper, 10 B & S numbers hard. If a softer temper is used care should be taken to assure that the copper has a grain size suitable for deep drawing without the development of orange peeling or other surface defects. It is considered very preferable to start with copper containing considerable cold-work strain so as to be certain of a fine grain in the final product, assuming that a brazing material is used requiring brazing temperatures above the recrystallization temperature of the copper.

All of these cladmetal components are pre-cut into disks of the previously stated diameter and in all cases their surfaces are thoroughly degreased. This may be done by the use of vapor methods, electrolytic methods or in any way effecting thorough degreasing. Degreasing may be satisfactorily effected by soaking the disks in an aqueous solution containing from 4 to 8 ounces of sodium hydroxide per gallon of water, the solution being maintained at temperatures from 160 to 200° F. The soaking time depends on the extent of the contamination which must be removed.

It is also necessary to remove surface oxides from the pre-cut disks. There are various known ways for removing such oxides.

For example, one method of removing the surface oxides from the copper disks is by immersing the disks in a solution consisting of 2 gallons of sulfuric acid, 1 gallon of nitric acid, 1 quart of water and ½ fluid ounce of hydrochloric acid, the solution being used at room temperature. In the case of the stainless steel disks, they may be treated by immersing them in a water solution of 40% hydrochloric acid, by volume, maintained at 185° F.

In case the work is proceeding rapidly the stainless and copper disks may be simply washed and dried, after they are cleaned and their surface oxides are removed. If operations are such that it may be necessary to store the disks long enough for oxides to form on their surfaces to a material degree, the disks may be throughly rinsed in water, rinsed quickly through two or more baths of anhydrous methyl alcohol and then stored in the final alcohol bath.

In the practice of the present invention it is to be understood that the sheet metal components have smooth surfaces. Rough surfaces are undesirable. The usual smoothness obtained by finished rolling methods at the mill is satisfactory. Cleaning and surface deoxidation methods which might unduly roughen the disk surfaces should be avoided.

As the next step the inside surface of each of the dried stainless steel disks is smoothly coated with a brazing flux solution including a volatile liquid permitting drying after application. The flux should be suitable to promote good brazing. The following solution, by weight, has been used satisfactorily:

| | Parts |
|---|---|
| Potassium hydroxide | 1 |
| "Handy Flux" | 9 |
| Water | 91 |

The "Handy Flux" component, manufactured by Handy and Harman, has the following (dry basis) analysis:

| | Percent |
|---|---|
| Potassium fluoride | 40 |
| Boric acid | 30 |
| Sodium borate | 30 |

This flux solution is uniformly applied to the inside surface of each stainless disk layer. This may be done by rotating the disk and applying the solution with a brush, or spraying or other methods may be used. In case the disks have been stored in the alcohol they may be either dried or wet with the flux while still wet with the alcohol. It may also be possible to store the disks in water since this protects their surfaces for reasonable time periods, and in such a case also they may be either dried or directly coated with the flux solution.

The stainless steel disks are positioned with their sides uppermost which are wet with the flux solution and brazing powder in the form of an airborne shower is permitted to fall on their wet surfaces. The brazing powder should be of adequately small particle size to fall uniformly. The shower may be created by blowing the powder upwardly into a tower and permitting the powder to fall on the disks. 300 mesh and 150 mesh particle sizes have been successfully used.

The physical properties of the wet flux layer should be such as to anchor the particles of brazing powder which fall uniformly on the disk surfaces throughout their extents. If the wet flux layer is too thick in dimension or too fluid or too low in viscosity it will permit the particles to float together so as to form lumps. The viscosity and thickness of the flux coating should be adjusted so that there is no tendency for the brazing metal particles to wash about when the disks are tipped slightly. The proportions of the flux and water components of the fluxing solution may be varied as required for the just mentioned purpose.

It is also necessary to adjust the thickness of the flux coating and its composition and the density with which the brazing particles are distributed. These factors should be adjusted so that after the disks are brazed together to make the cladmetal, the bond between the layers is in the form of a flux slag which forms a highly dispersed phase mingled with a matrix of the brazing metal and which does not interfere materially with the brazed bond during the deep drawing of the cladmetal disks. The appearance of the bond may be examined by pulling apart the layers of the finished cladmetal, which is possible by using adequate force, and using this as a guide, proper adjustments in the applications of the flux solution and the brazing particles may be made. Relatively little brazing metal is required and its use should be limited preferably to the minimum required to effect an adequate bond.

The brazing metal used should be a low-temperature brazing alloy. These usually contain silver and are relatively expensive but the small amount used by the present invention makes such brazing metal practical. One such alloy that has been used is "Easy-Flo," a proprietary brazing alloy manufactured by Handy and Harman, having a melting range between 1160 and 1175° F. and having the following composition, by weight:

| | Percent |
|---|---|
| Silver | 50 |
| Copper | 15.5 |
| Zinc | 16.5 |
| Cadmium | 18 |

This "Easy-Flo" alloy has a minimum tensile strength of 60,000 p. s. i. It may be obtained in powder form of varying degrees of fineness.

Other brazing alloys may be used providing they have melting range temperatures low enough to permit their use with the previously described pressure-brazing procedure, using the special fixture, in such a fashion that brazing may be effected without resorting to temperature and time factors causing the grain size of the copper to grow to an objectionable degree.

The various disks are assembled by superimposing one on another, in their proper relation, whereby to form a pack which is then placed in the fixture previously described and pressure-brazed in the described manner.

With the metal specifically disclosed hereinabove, namely, the stainless steel and copper components, proper brazing is effected by maintaining the molten bath 9, which may be a suitable salt, at a temperature of around 1450° F., and by allowing the fixture, containing the pack, to remain in the bath until the pack reaches a temperature throughout high enough to fuse the brazing material component. The thin sheet metal diaphragms and the fact that all of the cladmetal layers are in tight contact throughout their areas, permit rapid attainment of adequate brazing temperatures throughout the pack's thickness. As soon as the brazing temperature is reached throughout, the fixture is removed from the molten salt bath and without relaxing on the vacuum the fixture and its pack are permitted to cool. Preferably the fixture is quenched in oil or water so as to get the copper component rapidly below its temperature of rapid grain growth.

Since the copper components started out with a relatively high temper, the described brazing temperatures are high enough to effect recrystallization of the copper's grain structure. The recrystallized grains are, of course, very fine and before they can grow to an objectionable size the fixture and pack may be removed from the heating liquid and quenched.

It is to be understood that the metal from which the described fixture is constructed and the nature of the molten salt bath should be such as to avoid rapid destruction of the fixture. Ordinarily the fixture may be reused a number of times.

The described fixture and process may be used to clad base metal which is too thick to flex under the atmospheric pressure, providing the cladding metal is flexible to this degree. In such an instance only a single triplex product or two duplex products can be produced at one time within the fixture. Cladmetal of great surface area can be produced by the use of an appropriately sized fixture and a heating bath of adequate size. Cladmetal pieces of small area may conveniently be arranged within the fixture as a number of transversely interspaced piles with the diaphragms bearing against the ends of all of the piles. In all cases the entire pile and the cladmetal components should be thin enough to permit the atmospheric pressure to flex the components sufficiently to conform their interfaces with each other throughout their areas. In this fashion each pile or pack is in effect made into a solid block of metal until atmospheric pressure is returned to the inside of the fixture.

When the base metal is thick and not intended to be deep drawn or formed it is immaterial whether or not a large grain size is developed, and in some cases an orange peel effect may not be of importance even though it is developed. Also this kind of defect may not be a problem when the base metal is other than copper. However, one great advantage of the present invention is its ability to clad copper or cuprous alloys without incidentally developing a grain size large enough to cause the orange peel effect during deep drawing and forming.

It is to be understood that when referring to "fine" grain size that this means a grain size small enough to prevent orange peeling under the conditions of gauge, type and form of the drawing or forming and similar factors involved.

The brazing powder must be uniformly distributed and other methods for applying it may be practicable. For example, electrostatic deposition methods have been used.

Tightness of the described fixture may be enhanced by the use of a thin layer of heavy oil of the type intended for high temperature lubricating use. A graphited oil may be used. When such material is applied between the interfaces of the diaphragms and rings substantial air-tightness results.

Due to the rapidity with which the brazing cycle is completed it is unnecessary to use a stainless steel of the type stabilized against carbide precipitation, with its attendant higher cost as compared to ordinary stainless steel.

It has been indicated that low-temperature brazing alloys are ordinarily of relatively high silver content. This does not mean that the silver content necessarily must be high in all cases and it is possible that satisfactory brazing alloys may be developed which contain little or no silver but which have an adequately low melting range together with the required strength.

When using the fixture the atmospheric pressure bears on the hot liquid and it is the latter that presses the diaphragms together. Thus, the cladmetal components inside of the fixture are pressed together, in effect, by the hot liquid which, therefore, applies both the brazing heat and the pressure.

It is apparent from the foregoing that when reference is made herein to the outermost layers as being within sheet metal gauges, or thin enough to flex under atmospheric pressure, that either of the layers of a duplex product, for example, may be the outermost layer referred to. Ordinarily this would be the layer exposed to conditions requiring a stainless characteristic and, therefore, it has been called the outermost layer. At least one of the layers should have the flexibility described. The pressure used should be sufficient to flex this layer and since atmospheric pressure is used the maximum stiffness of the outermost layer is fixed by this factor. With thinner and more flexible sheet material a lesser pressure becomes sufficient, such as obtained by partial evacuation of the described fixture. The amount of pressure required is easily determined because insufficient pressure is made evident by unbonded areas in the final product, showing incomplete face-to-face contact throughout the layers while in the fixture.

The liquid heating bath may be a molten salt of the type used in heat treating. In order to minimize damage to the fixture, the salt should preferably be neutral, that is neither oxidizing nor carburizing in its effect on the fixture. The salt should possess the usual properties characteristic of good heat treating salts in that it should provide good heat transfer, be chemically stable and free from objectionable fumes at operating temperature, be readily removable from heat treated parts and be suitably fluid at the operating temperature. This last characteristic is particularly important in the laminating process as described above. It has been found in practicing the present invention that a fixture imperfectly sealed before immersion in the salt bath will often show a decided improvement in the quality of the seal, as shown by a decrease of internal pressure, after being placed in the molten salt. This phenomenon is attributed to the action of the salt bath in freezing around the fixture and sealing off small leaks. During continued immersion of the fixture in the salt bath the initial crust of frozen salt around the fixture remelts, but even in its molten state the salt is effecive in sealing off small leaks in the fixture. Chloride salts have been successfully used. A mixture of 60% sodium chloride and 40% potassium chloride by weight is preferred, although 45% sodium chloride and 55% potassium chloride has been successfully used. Other salt mixtures or different types of heating baths may prove to be suitable.

We claim:

1. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween.

2. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred to said brazing metal by immersing said fixture in a hot liquid providing direct heat conduction from said liquid through said diaphragm and layer, pressed together by the atmospheric pressure, to said brazing metal under said pressure between said surfaces.

3. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred from said brazing metal by quenching said fixture in a quenching liquid providing direct heat conduction to said liquid through said diaphragm and layer, pressed together by the atmospheric pressure, from said brazing metal under said pressure between said surfaces.

4. A process for metal cladding a metal base, said process including positioning a thin flexible layer of cladding metal on said base with brazing metal between the mutually facing surfaces of said base and layer to form an assembly, enclosing said assembly in a substantially airtight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred to said brazing metal by immersing said fixture in a hot liquid providing direct heat conduction from said liquid through said diaphragm and layer, pressed together by the atmospheric pressure, to said brazing metal under said pressure between said surfaces, said heat being transferred from said brazing metal by quenching said fixture in a quenching liquid providing direct heat conduction to said liquid through said diaphragm and layer, pressed together by the atmospheric pressure, from said brazing metal under said pressure between said surfaces, said base being a layer of cuprous alloy of a thickness and composition normally suitable for deep drawing and forming but subject to orange peeling when drawn after being maintained at the temperature of said brazing heat for a time period causing excessive grain growth in said alloy, said fixture being removed from said hot liquid and quenched in said quenching liquid prior to the expiration of said time period causing said excessive grain growth.

5. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred to said brazing metal by immersing said fixture in a hot liquid providing direct heat conduction from said liquid through said diaphragm and layer, pressed together by the atmospheric pressure, to said brazing metal under said pressure between said surfaces, said heat being transferred from said brazing metal by quenching said fixture in a quenching liquid providing direct heat conduction to said liquid through said diaphragm and layer, pressed together by the atmospheric pressure, from said brazing metal under said pressure between said surfaces, said base being a layer of cuprous alloy of a thickness and composition normally suitable for deep drawing and forming but subject to orange peeling when drawn after being maintained at the temperature of said brazing heat for a time period causing excessive grain growth in said alloy, said fixture being removed from said hot liquid and quenched in said quenching liquid prior to the expiration of said time period causing said excessive grain growth, said cladding layer being a layer of stainless steel so thin that if said base metal exhibits orange peeling the latter will be visible on said outer side of said cladding layer.

6. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said brazing metal being positioned between said surfaces in the form of a uniform dispersion of powdered particles of said brazing metal, said particles being adhesively fastened to one of said surfaces by a thin layer of dry brazing flux.

7. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said brazing powder being positioned between said surfaces prior to said layer being positioned on said base, by applying to one of said surfaces a coating of a solution of brazing flux and a volatile liquid, creating an airborne shower of powdered particles of said brazing metal and causing said shower to fall on said coated surface while the latter is horizontal and said coating it wet, and drying said coating so that its flux component adhesively secures said particles to said surface, the viscosity and thickness of said coating being adjusted so that said particles do not wash about on said surface prior to said drying.

8. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred to said brazing metal by immersing said fixture in a hot liquid providing direct heat conduction from said liquid through said diaphragm and layer, pressed together by the atmospheric pressure, to said brazing metal under said pressure between said surfaces, said heat being transferred from said brazing metal by quenching said fixture in a quenching liquid providing direct heat conduction to said liquid through said diaphragm and layer, pressed together by the atmospheric pressure, from said brazing metal under said pressure between said surfaces, said base being a layer of cuprous alloy of a thickness and composition normally suitable for deep drawing and forming but subject to orange peeling when drawn after being maintained at the temperature of said brazing heat for a time period causing excessive grain growth in said alloy, said fixture being removed from said hot liquid and quenched in said quenching liquid prior to the expiration of said time period causing said excessive grain growth, said cladding layer being a layer of stainless steel so thin that if said base metal exhibits orange peeling the latter will be visible on said outer side of said cladding layer, said brazing powder being positioned between said surfaces prior to said layer being positioned on said base, by applying to one of said surfaces a coating of a solution of brazing flux and a volatile liquid, creating an airborne shower of powdered particles of said brazing metal and causing said shower to fall on said coated surface while the latter is horizontal and said coating is wet, and drying said coating so that its flux component adhesively secures said particles to said surface, the viscosity and thickness of said coating being adjusted so that said particles do not wash about on said surface prior to said drying.

9. A process for making cladmetal, said process including forming a plurality of assemblies each comprising a thin flexible layer of metal cladding positioned on a thin flexible metal layer base with brazing metal positioned between the mutually facing surfaces of said base and cladding, piling said assemblies to form a stack, enclosing said stack in a substantially air-tight fixture having thin flexible diaphragms which are substantially co-extensive with the ends of said stack and are positioned to press against said ends when said fixture is evacuated, evacuating said fixture, and applying heat to said brazing metal and subsequently removing said heat therefrom through said diaphragms and said stack's cladding and bases while said fixture is evacuated, said diaphragms and said cladding and bases being thin and flexible enough to flex throughout said stack under the atmospheric pressure and force said surfaces to conform to each other throughout their extents and to press together under pressure uniformly distributed throughout said stack on said brazing metal.

10. Deep drawing cladmetal produced by the process of claim 5 and comprising a cuprous metal base layer and stainless metal cladding layer brazed together, said cladding being so thin that if said base layer orange peels during drawing this defect is visible on the surface of the cladding, said cuprous metal base being fine grained to a degree permitting deep drawing without orange peeling.

11. Cladmetal produced by the process of claim 6 and comprising a metal base having a cladding layer secured thereto by a bond in the form of a flux slag which forms a highly dispersed phase mingled with a matrix of brazing metal.

12. A process for metal cladding a metal base, said process including positioning a thin flexible layer of cladding metal on said base with brazing metal between the mutually facing surfaces of said base and layer to form an assembly, enclosing said assembly in a substantially air-tight fixture having a thin flexible metal diaphragm which is substantially co-extensive with said layer and positioned to press on the outer side of said layer when said fixture is evacuated, evacuating said fixture, and applying brazing heat to said brazing metal and subsequently removing said heat therefrom through said diaphragm and said layer while said fixture is evacuated, said layer and said diaphragm being thin and flexible enough under atmospheric pressure to flex throughout the entire extent of said layer and force said surfaces to conform to each other throughout their extents and to press together under pressure uniformly distributed throughout on said brazing metal therebetween, said heat being transferred to said brazing metal by immersing said fixture in a hot liquid providing direct heat conduction from said liquid through said diaphragm and layer, pressed together by the atmospheric pressure, to said brazing metal under said pressure between said surfaces, said heat being transferred from said brazing metal by quenching said fixture in a quenching liquid providing direct heat conduction to said liquid through said diaphragm and layer, pressed together by the atmospheric pressure, from said brazing metal under said pressure between said surfaces, said base being a layer of cuprous alloy of a thickness and composition normally suitable for deep drawing and forming but subject to orange peeling when drawn after being maintained at the temperature of said brazing heat for a time period causing excessive grain growth in said alloy, said fixture being removed from said hot liquid and quenched in said quenching liquid prior to the expiration of said time period causing said excessive grain growth, said cladding layer being a layer of stainless steel so thin that if said base metal exhibits orange peeling the latter will be visible on said outer side of said cladding layer, said cuprous alloy initially containing cold work strain and said brazing heat and said hot liquid having temperatures above the recrystallizing temperature of said cuprous alloy.

References Cited in the file of this patent
UNITED STATES PATENTS

| 2,023,354 | Cope | Dec. 3, 1935 |
| 2,154,273 | Kollsman | Apr. 11, 1939 |
| 2,160,558 | Orr | May 30, 1939 |
| 2,210,314 | Wright | Aug. 6, 1940 |
| 2,366,164 | Weick et al. | Jan. 2, 1945 |
| 2,473,712 | Kinney | June 21, 1949 |
| 2,713,196 | Brown | July 19, 1955 |